Patented Oct. 23, 1934

1,978,198

UNITED STATES PATENT OFFICE 1,978,198

PROCESS OF OXIDIZING AMMONIA AND CATALYST THEREFOR

Stanley L. Handforth, Woodbury, N. J., assignor of one-half to E. I. du Pont de Nemours & Company, Wilmington, Del., a corporation of Delaware, and one-half to Baker and Company, Inc., Newark, N. J., a corporation of New Jersey No Drawing. Application October 27, 1931, Serial No. 571,458

11 Claims. (Cl. 23—162)

This invention relates to a process of oxidizing ammonia to form oxides of nitrogen and more particularly, it relates to an improved catalyst for carrying out such process.

According to the prior art, in the ordinary process of oxidizing ammonia to oxides of nitrogen and thence to nitric acid, the ammonia and air or other oxygen containing gas are mixed and passed at an elevated temperature through a catalyst which causes the reaction to take place. The catalyst most commonly employed consists of a series of fine gauzes or nets, made of platinum or platinum group alloys. At the elevated temperatures at which these catalysts have to work there is a serious loss of the valuable catalytic material and a disintegration of the structure. This loss and disintegration introduce an appreciable expense in the manufacture of nitric acid by this process. Also these catalysts are easily poisoned and in general an appreciable percentage of ammonia is converted to free nitrogen and lost. This lowers the yield of nitric acid and thereby increases the cost.

The object of this invention is an improved process of oxidizing ammonia to oxides of nitrogen or nitric acid. A further object of the invention is an improved catalyst capable of withstanding the conditions of operation without excessive loss or disintegration. A still further object is an improved catalyst which is less readily poisoned and which will give a higher conversion efficiency than heretofore consistently obtained.

As heretofore mentioned, platinum or alloys of platinum group metals are extremely good catalysts for this reaction, but are volatilized and lose weight under the conditions under which the reaction is carried out and the structure of the catalyst therefore disintegrates. These catalysts are also rather easily poisoned and do not give perfect conversion efficiency. I have found that tungsten is a catalyst for this reaction but is almost immediately converted to the oxide of tungsten which is not so active. Even so neither the metal nor the oxide are volatilized under the conditions under which the reaction is carried out. I have now found that an alloy of platinum and tungsten or an alloy of platinum and rhodium and tungsten can be made which combines most of the good qualities of all three metals and overcomes many of the objectionable features. The loss of metal from such an alloy is appreciably less than from the platinum catalysts heretofore used. The catalyst is less easily poisoned and gives exceptionally good conversion efficiencies.

While it is possible to use an alloy containing almost any proportion of tungsten from 0.1 to 30 per cent, the alloys containing higher amounts of tungsten are so extremely brittle that they can only be used in the form of chips or granules. Lower percentages of tungsten also are not as effective in reducing the loss of the catalyst metal. I therefore prefer to use an alloy of platinum containing from 1 to 5 per cent tungsten or a platinum-rhodium-tungsten alloy containing 1 to 5 per cent tungsten and 1 to 10 per cent rhodium. For example, a satisfactory catalyst may be made containing 97 per cent platinum and 3 per cent tungsten. Another extremely satisfactory catalyst is one containing 92 per cent platinum, 5 per cent rhodium, and 3 per cent tungsten. These catalysts can be made in the form of wire gauzes, nets, or the like, as normally used for the platinum alloys. A catalyst containing 15 per cent tungsten, the balance being platinum or platinum and rhodium, can be used in the form of a bed of chips or granules.

In carrying out my invention the mixture of ammonia and oxygen containing gas is passed through on a catalyst composed of several layers of fine mesh gauze or one of the foregoing alloys or through a thin bed of chips or granules of one of the foregoing alloys. The type of converter or shape of catalyst for carrying out the reaction is immaterial. While I prefer to operate the catalyst at a temperature of about 850° C. the temperature may, of course, vary within the limits usually practiced in ammonia oxidation; that is, from 650° C. to 1200° C. It is possible to operate the process either at atmospheric pressure, at pressures less than atmospheric, or at pressures greater than atmospheric.

In the place of tungsten, other metals of the fifth and sixth groups of the periodic system may be used, such as chromium, molybdenum, niobium, tantalum, uranium, or vanadium, and the proportions of these metals may vary as in the case of tungsten. Also, a combination of two or more of these metals may be alloyed with platinum, or with platinum and rhodium, for my purpose. Furthermore, the process of oxidizing ammonia may be improved by coating a platinum catalyst, or a platinum-rhodium alloy catalyst with one of these metals of the fifth and sixth groups of the periodic system before subjecting the catalyst to the conditions of operation.

It will be apparent from the foregoing that many different embodiments of this invention exist and may be practiced without departing from the spirit thereof. It is therefore to be understood that I do not intend to be limited to the specific embodiments described except as indicated in the appended claims.

I claim:

1. The process of oxidizing ammonia to oxides of nitrogen which comprises passing a mixture of ammonia and an oxygen containing gas in contact with a catalyst comprising an alloy of platinum and a metal taken from the combined fifth and sixth groups of the periodic system.

2. The process of oxidizing ammonia to oxides of nitrogen which comprises passing a mixture of ammonia and an oxygen containing gas in contact with a catalyst comprising an alloy of platinum and a metal taken from a group consisting of chromium, molybdenum, niobium, tantalum, tungsten, uranium and vanadium.

3. The process of oxidizing ammonia to oxides of nitrogen which comprises passing a mixture of ammonia and an oxygen containing gas in contact with a catalyst comprising an alloy of platinum, rhodium, and a metal taken from the combined fifth and sixth groups of the periodic system.

4. The process of claim 3 in which the catalyst contains 0.1 per cent to 30 per cent by weight of the metal taken from the combined fifth and sixth groups of the periodic system.

5. The process of claim 3 in which the catalyst contains 1 per cent to 8 per cent by weight of the metal taken from the combined fifth and sixth groups of the periodic system.

6. The process of claim 3 in which the catalyst contains 1 to 15 per cent of the metal taken from the fifth and sixth groups of the periodic system.

7. The process of oxidizing ammonia to oxides of nitrogen which comprises passing a mixture of ammonia and an oxygen containing gas in contact with a catalyst comprising an alloy of platinum and tungsten.

8. A process of oxidizing ammonia to oxides of nitrogen which comprises passing a mixture of ammonia and an oxygen containing gas in contact with a catalyst comprising an alloy of platinum, rhodium and tungsten.

9. The process of oxidizing ammonia to oxides of nitrogen by means of a catalyst comprising an alloy of platinum and rhodium containing from 1 per cent to 15 per cent tungsten.

10. A catalyst comprising an alloy of platinum, rhodium, and a metal taken from the fifth and sixth groups of the periodic system.

11. A catalyst comprising an alloy of platinum and rhodium containing from 1 to 15 per cent of a metal taken from the fifth and sixth groups of the periodic system.

STANLEY L. HANDFORTH.